United States Patent
Murai et al.

(10) Patent No.: US 10,473,977 B2
(45) Date of Patent: Nov. 12, 2019

(54) SURFACE LIGHT SOURCE APPARATUS COMPRISING A LIGHT-DISTRIBUTION CONTROL ELEMENT HAVING A DIFFUSION PART AND LIQUID CRYSTAL DISPLAY HAVING THE SAME

(71) Applicant: Mitsubishi Electric Corporation, Tokyo (JP)

(72) Inventors: Hideyuki Murai, Tokyo (JP); Tomohiko Sawanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/666,968

(22) Filed: Aug. 2, 2017

(65) Prior Publication Data

US 2018/0059484 A1    Mar. 1, 2018

(30) Foreign Application Priority Data

Aug. 31, 2016   (JP) ................................. 2016-168725

(51) Int. Cl.
*G02F 1/1335*    (2006.01)

(52) U.S. Cl.
CPC .. *G02F 1/133606* (2013.01); *G02F 1/133603* (2013.01); *G02F 1/133605* (2013.01); *G02F 2001/133607* (2013.01)

(58) Field of Classification Search
CPC ............... G02F 2001/133607; G02F 1/133605
See application file for complete search history.

(56) References Cited

U.S. PATENT DOCUMENTS

| 7,988,337 B2* | 8/2011 | Huang | F21V 7/0091 |
| | | | 362/299 |
| 8,508,688 B2* | 8/2013 | Iiyama | G02F 1/133603 |
| | | | 349/61 |
| 8,558,967 B2* | 10/2013 | Iiyama | G02F 1/133603 |
| | | | 349/62 |
| 8,926,114 B2* | 1/2015 | Park | F21K 9/60 |
| | | | 362/97.1 |
| 2011/0089453 A1* | 4/2011 | Min | F21V 5/04 |
| | | | 257/98 |

(Continued)

FOREIGN PATENT DOCUMENTS

JP    2006-286608 A    10/2006

*Primary Examiner* — Paul C Lee
(74) *Attorney, Agent, or Firm* — Birch, Stewart, Kolasch & Birch, LLP

(57) ABSTRACT

Provided is a surface light source apparatus that improves homogeneity of surface illumination light, using both light rays passing through a light emitting surface of a light-distribution control element and the reflected light rays. A surface light source apparatus according to the present invention includes: a light source; a holding substrate having a main surface on which the light source is held; a light-distribution control element disposed on the main surface of the holding substrate to cover the light source, the light-distribution control element changing distribution of light emitted from the light source; and a diffuser that diffuses light emitted from the light-distribution control element. The light-distribution control element includes a diffusion part disposed at an installation surface that can abut the main surface of the holding substrate.

7 Claims, 9 Drawing Sheets

(56) References Cited

U.S. PATENT DOCUMENTS

| | | | | |
|---|---|---|---|---|
| 2013/0286657 | A1* | 10/2013 | Chen | F21V 7/0091 362/308 |
| 2014/0043826 | A1* | 2/2014 | Seo | F21V 13/04 362/309 |
| 2014/0063816 | A1* | 3/2014 | Seki | F21V 5/04 362/309 |
| 2015/0109762 | A1* | 4/2015 | Lee | G09F 13/04 362/97.1 |
| 2015/0159831 | A1* | 6/2015 | Kang | F21V 5/007 362/240 |
| 2015/0159834 | A1* | 6/2015 | Chang | G02F 1/133606 362/97.1 |
| 2015/0219966 | A1* | 8/2015 | Song | G02B 19/0071 362/97.3 |
| 2015/0241020 | A1* | 8/2015 | Lee | G02F 1/133603 362/308 |
| 2015/0260371 | A1* | 9/2015 | Takatori | G02F 1/133603 362/97.1 |
| 2015/0268513 | A1* | 9/2015 | Chang | G02F 1/133605 362/97.1 |
| 2015/0285467 | A1* | 10/2015 | Choi | G09F 9/30 362/97.1 |
| 2015/0292708 | A1* | 10/2015 | Park | F21V 5/007 362/97.1 |
| 2015/0301379 | A1* | 10/2015 | Jung | G02F 1/13306 349/61 |

\* cited by examiner

SURFACE LIGHT SOURCE APPARATUS COMPRISING A LIGHT-DISTRIBUTION CONTROL ELEMENT HAVING A DIFFUSION PART AND LIQUID CRYSTAL DISPLAY HAVING THE SAME

BACKGROUND OF THE INVENTION

Field of the Invention

The present invention relates to a surface light source apparatus that emits surface light, and to a liquid crystal display including the surface light source apparatus.

Description of the Background Art

Liquid crystal panels included in liquid crystal displays do not produce light by themselves. Thus, the liquid crystal displays include a backlight, that is, a surface light source apparatus at the rear surface of a liquid crystal panel as a light source for illuminating the liquid crystal panel. The backlights include, as one structure, direct illumination-type backlights with a plurality of light emitting diodes (hereinafter referred to as "LEDs") arranged. Recent years have seen the development of compact, high-efficient, and high-output LEDs. Thus, even with decrease in the number of LEDs or LED bars to be installed in a backlight, the backlight can mathematically obtain the same brightness as the conventional backlights. Here, the LED bar is a light source with LEDs arranged in a row. Japanese Patent Application Laid-Open No. 2006-286608 discloses a backlight that expands light rays emitted from an LED through a cylindrical lens to convert the light rays into surface illumination light.

In the backlight disclosed by Japanese Patent Application Laid-Open No. 2006-286608, when the light passes into the air through the cylindrical lens, a part of the light is reflected by a boundary between the cylindrical lens and the air. Improvement in homogeneity of illumination light requires use of both the direct light passing through the boundary and the light reflected by the boundary as the illumination light. However, the wider the divergence angle of the light emitted from a light source is, the more the reflected light increases. Thus, it is difficult to suppress decrease in the amount of light in the periphery or corners of an area illuminated by the backlight.

SUMMARY

The present invention has an object of providing a surface light source apparatus that improves homogeneity of surface illumination light, using both light rays passing through a light emitting surface of a light-distribution control element and the reflected light rays.

A surface light source apparatus according to the present invention includes: a light source; a holding substrate having a main surface on which the light source is held; a light-distribution control element disposed on the main surface of the holding substrate to cover the light source, the light-distribution control element changing distribution of light emitted from the light source; and a diffuser that diffuses light emitted from the light-distribution control element. The light-distribution control element includes a diffusion part disposed at an installation surface that can abut the main surface of the holding substrate.

According to the present invention, it is possible to provide a surface light source apparatus that improves homogeneity of surface illumination light, using both light rays passing through a light emitting surface of a light-distribution control element and the reflected light rays.

These and other objects features, aspects and advantages of the present invention will become more apparent from the following detailed description of the present invention when taken in conjunction with the accompanying drawings.

DESCRIPTION OF THE PREFERRED EMBODIMENTS

Figure 1:
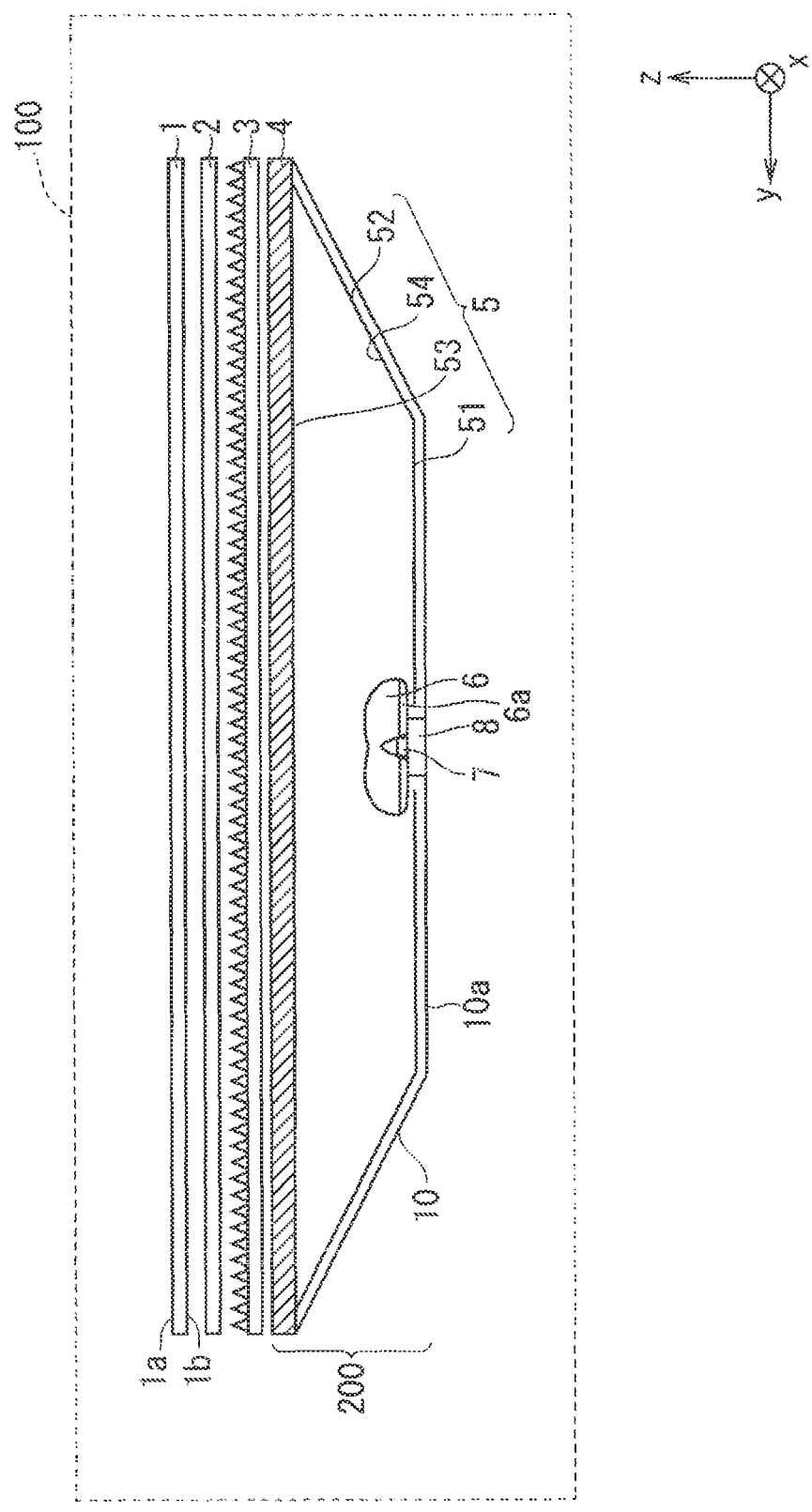
FIG. 1 illustrates a cross section of a structure of a liquid crystal display according to an embodiment.

An embodiment of a surface light source apparatus and a liquid crystal display including the surface light source apparatus according to the present invention will be described with reference to the drawings. The liquid crystal display and the surface light source apparatus in the drawings are illustrated based on x-y-z orthogonal coordinates. A direction perpendicular to an x-y plane that is a plane including an x axis and a y axis is a z-axis direction.

In the Specification, the directions are defined as indicated below. For example, when a liquid crystal panel is rectangular, a long-side direction of the liquid crystal panel is defined as an x-axis direction, and a short-side direction of the liquid crystal panel is defined as a y-axis direction. In FIG. 1, the long-side direction of a liquid crystal panel 1 is a direction vertical to the paper, and the short-side direction of the liquid crystal panel 1 is a direction to the right or left of the paper. When the long side of the liquid crystal panel 1 is horizontally disposed and the short side thereof is vertically disposed, the x-axis direction is the horizontal direction, and the y-axis direction is the vertical direction. Here, the top surface of the liquid crystal display 100 is in a positive direction of the y axis (+y-axis direction), and the bottom surface thereof is in a negative direction of the y axis (−y-axis direction). Furthermore, a direction in which the liquid crystal display 100 displays an image is a positive direction of the −z-axis (+z-axis direction), and the opposite direction thereof is a negative direction of the −z-axis (−z-axis direction). Furthermore, the +z-axis direction side will be referred to as a display surface side. The −z-axis direction side will be referred to as a rear surface side. Furthermore, the right side of the liquid crystal display 100 when viewed from the display surface side is in a positive direction of the x axis (+x-axis direction), and the left side thereof is in a negative direction of the x axis (−x-axis direction). "When viewed from the display surface side" means viewing the −z-axis direction side from the +z-axis direction side.

Structure of Liquid Crystal Display

FIG. 1 schematically illustrates a cross section of a structure of a surface light source apparatus 200 and a structure of the liquid crystal display 100 including the surface light source apparatus 200 according to the embodiment. The liquid crystal display 100 includes the liquid crystal display panel 1 of transmissive type, and the surface light source apparatus 200. Furthermore, the liquid crystal display 100 includes optical sheets 2 and 3 between the liquid crystal panel 1 and the surface light source apparatus 200. Furthermore, a diffuser 4 is disposed on a light emitting surface of the surface light source apparatus 200. In other words, the diffuser 4 is provided on an opening part 53 of the surface light source apparatus 200. The liquid crystal display panel 1, the optical sheets 2 and 3, the diffuser 4, and the surface light source apparatus 200 are arranged in order from the +z-axis direction to the −z-axis direction. The liquid crystal panel 1 has a rear surface 1b facing the surface light source apparatus 200 through the optical sheets 2 and 3. Furthermore, the liquid crystal panel 1 has a display surface 1a opposite to the rear surface 1b. The rear surface 1b is a surface in the −z-axis direction, and the display surface 1a is a surface in the +z-axis direction. The display surface 1a is planar rectangular. In other words, the display surface 1a has a plane that spreads in a direction parallel to the x-y plane. Furthermore, the long sides in the x-axis direction are orthogonal to the short sides in the y-axis direction, where the long sides and the short sides compose the plane. The described shape of the display surface 1a is one example, and may be different. Furthermore, the liquid crystal panel 1 includes a liquid crystal layer having a surface structure that spreads in the direction parallel to the x-y plane.

The surface light source apparatus 200 emits surface light from the diffuser 4, and illuminates the rear surface 1b of the liquid crystal panel 1 through the optical sheets 2 and 3. The optical sheet 3 has a function of directing the light emitted from the diffuser 4 normal to the display surface 1a of the liquid crystal panel 1. The optical sheet 2 reduces, for example, variations in detailed illumination light and suppresses an optical malfunction. The liquid crystal panel 1 converts the illumination light incident on the rear surface 1b into image light. The "image light" means light having image information.

Structure of Surface Light Source Apparatus

The surface light source apparatus 200 includes light sources 7, a holding substrate 8, a light-distribution control element 6, and a reflector 5. The reflector 5 has a container shape capable of accommodating the light sources 7 and the light-distribution control element 6, and includes a reflecting surface 54 and the opening part 53. The surface light source apparatus 200 further includes a housing 10. The housing 10 is a part that holds and accommodates the reflector 5 and the holding substrate 8. The reflector 5 is disposed along the inner surface of the housing 10. The housing 10 has a container shape to reflect the shape of the reflector 5, with the top surface, that is, the liquid crystal panel 1 side opened. The housing 10 is made of, for example, a resin or a metal plate.

Figure 2:
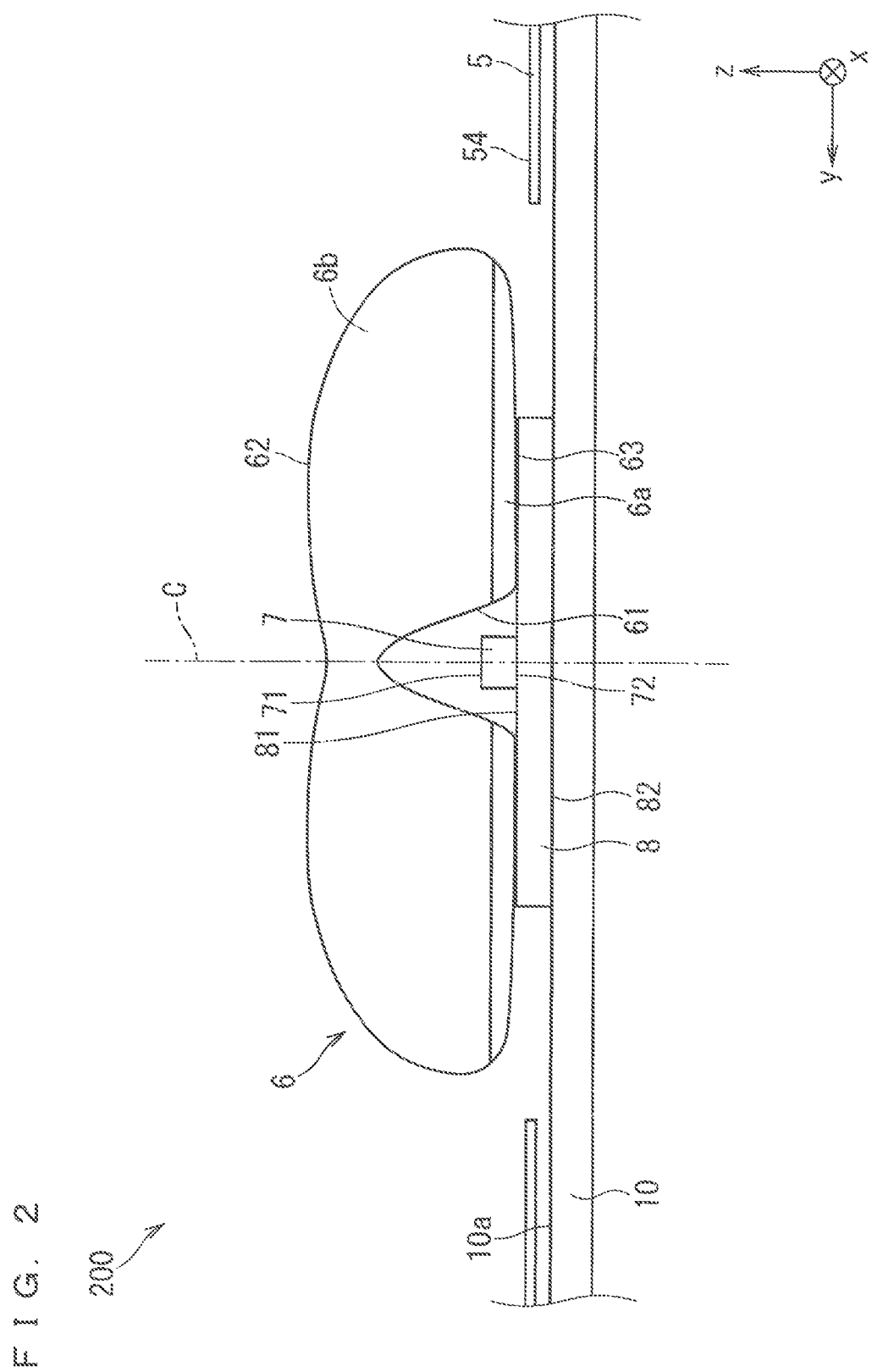
FIG. 2 illustrates a cross section of a structure of the vicinity of a light source included in a surface light source apparatus according to the embodiment.

FIG. 2 illustrates a cross section of the enlarged vicinity of the light source 7 of the surface light source apparatus 200. The light sources 7 are disposed on a main surface 81 of the holding substrate 8. The main surface 81 is a top surface of the holding substrate 8, for example, a mounting surface. The light-distribution control element 6 is disposed on the main surface 81 side of the holding substrate 8 to cover the light sources 7. Furthermore, the light-distribution control element 6 has an installation surface 63 that can abut the main surface 81. Furthermore, the light-distribution control element 6 includes a diffusion part 6a disposed at the installation surface 63. The detailed structure of the surface light source apparatus 200 will be described hereinafter.

Holding Substrate

The holding substrate 8 according to the embodiment is longer in the long-side direction of the liquid crystal panel 1, and is rectangular in the plan view. Furthermore, the holding substrate 8 is plate-shaped. The main surface 81 of the holding substrate 8 includes, for example, a white silk layer on a resist layer or a white resist layer. The main surface 81 functions as a reflecting surface. As illustrated in FIG. 2, the holding substrate 8 on which the light sources 7 and the light-distribution control element 6 are disposed are held on a bottom surface 10a of the housing 10. The surface of the holding substrate 8 held on the bottom surface 10a of the housing 10 is a rear surface 82 opposite to the main surface 81. The rear surface 82 is a surface of the holding substrate 8 on the −z-axis side. The rear surface 82 transfers the heat generated by the light sources 7 to the housing 10 through the main surface 81 to dissipate the heat. Furthermore, the surface light source apparatus 200 may have, for example, a heat dissipation sheet between the holding substrate 8 and the housing 10 to enhance the heat dissipation effect.

Light Sources

The light sources 7 are disposed on the main surface 81 of the holding substrate 8. According to the embodiment, a plurality of the light sources 7 are arranged in a row at predetermined intervals. The arrangement direction is the long-side direction of the liquid crystal panel 1, that is, the x-axis direction. Furthermore, as illustrated in FIG. 2, a rear surface 72 that is a surface of the light source 7 on the −z-axis side is in contact with the main surface 81 of the holding substrate 8. Accordingly, the light sources 7 are held by the holding substrate 8. Furthermore, the light source 7 is supplied with electricity through the rear surface 72. The light source 7 is electrically connected to the holding substrate 8. Furthermore, surfaces of the light source 7 except for the rear surface 72 are light emission surfaces according to the embodiment. For example, a front surface 71 opposite to the rear surface 72 of the light source 7 is a light emission surface. Alternatively, when the light source 7 is cuboid-shaped, for example, five surfaces of the light source 7 except for the rear surface 72 are light emission surfaces.

The light source 7 is, for example, a solid-state light source. The solid-state light source is, for example, a LED. Alternatively, examples of the light source 7 include an organic electroluminescence (EL) light source and a light source that emits excitation light to a phosphor applied to a flat surface to cause the phosphor to emit light. The light sources 7 are LEDs according to the embodiment.

Light-Distribution Control Element and Diffusion Part

The light-distribution control element 6 is disposed on the main surface 81 side of the holding substrate 8 to cover the light source 7. In other words, the light-distribution control element 6 is disposed in the +z-axis direction with respect to the light sources 7 to surround the light sources 7. Furthermore, the light-distribution control element 6 has the installation surface 63 that can abut the main surface 81. The installation surface 63 is, but not necessarily, in contact with the main surface 81 in FIG. 2. An air gap may be provided between the installation surface 63 and the main surface 81. The light-distribution control element 6 includes the diffusion part 6a disposed at the installation surface 63. As illustrated in FIG. 2, when the installation surface 63 of the light-distribution control element 6 is wider than the main surface 81 of the holding substrate 8, the diffusion part 6a is disposed to protrude outside of the main surface 81. The light-distribution control element 6 further includes a light-distribution control element body 6b. The light-distribution control element body 6b and the diffusion part 6a are formed as a single part according to the embodiment.

The light-distribution control element 6 is made of a transparent material, for example, an acrylic resin (PMMA). The diffusion part 6a contains a diffusing material. The diffusing material is a material for diffusely reflecting light, for example, a high-reflective resin material. Although the light-distribution control element body 6b may contain the diffusing material, the diffusion part 6a contains the diffusing material higher in concentration than that contained in the light-distribution control element body 6b. The diffusion part 6a and the light-distribution control element body 6b are formed by, for example, two-color molding.

Furthermore, the light-distribution control element 6 is an optical element having a rod shape along a direction in which the plurality of light sources 7 are arranged. In other words, the light-distribution control element 6 is a rod-shaped optical element that extends in the x-axis direction. The light-distribution control element 6 is, for example, a cylindrical lens. The cylindrical lens is a lens having a cylindrical refracting surface. The cylindrical lens has a curvature in a first direction, and does not have a curvature in a second direction perpendicular to the first direction. The light emitted from the cylindrical lens converges only in one direction or diverges. For example, parallel light incident on a protruding cylindrical lens linearly converges. The converging line is called a focal line. According to the embodiment, the first direction is a direction orthogonal to the direction in which the light sources 7 are arranged, that is, the y-axis direction. The second direction is a direction parallel to the direction in which the light sources 7 are arranged, that is, the x-axis direction.

As illustrated in FIG. 2, the light-distribution control element 6 has a light incident surface 61 on which the light emitted from the light source 7 is incident. The light incident surface 61 extends in the arrangement direction of the light sources 7 according to the embodiment. The light incident surface 61 is formed to include a depressed curved surface or a flat surface to cover the light sources 7. The depressed curved surface is, for example, an aspheric surface or a cylindrical surface. Furthermore, the light-distribution control element 6 has a light emitting surface 62 from which the light incident on the light incident surface 61 is emitted outside of the light-distribution control element 6. The light emitting surface 62 is positioned opposite to the light sources 7 with respect to the light incident surface 61. In other words, the light emitting surface 62 is a surface of the light-distribution control element 6 in the +z-axis direction. The light emitting surface 62 includes a protruding cylindrical surface having a curvature in a direction orthogonal to the arrangement direction of the light sources 7. In other words, the light emitting surface 62 has a cylindrical surface having a curvature in the y-axis direction. An optical axis C of the light-distribution control element 6 is parallel to the −z-axis. The "optical axis" herein is a straight line that passes through the center and a focal point of, for example, a lens or a spherical mirror. When an optical element has a cylindrical surface, the optical axis is defined according to the cross-sectional shape of the optical element having a curvature. In the embodiment, the optical axis C is defined according to a plane perpendicular to the direction in which the light sources 7 are arranged, that is, the shape of the light emitting surface 62 in the y-z plane perpendicular to the x-axis direction. The light emitting surface 62 has a point of intersection with the optical axis C.

Furthermore, the light sources 7 are disposed in a depressed portion formed by the light incident surface 61. The depressed portion is a space enclosed by the light incident surface 61 and the main surface 81 of the holding substrate 8. In other words, the depressed portion is a space positioned on the −z-axis side with respect to the light incident surface 61 Furthermore, the light sources 7 are arranged in a cylindrical axis direction defined by the cylindrical surface of the light emitting surface 62. The "cylindrical axis" is an axis different from the optical axis C, and parallel to the x axis. Furthermore, the optical axis C of the light-distribution control element 6 preferably passes through the center of the light source 7. Furthermore, the optical axis C preferably matches a direction in which a luminous intensity is the highest, in the distribution of the light emitted by the light sources 7. Alternatively, the optical axis C preferably matches a direction in which a light-distribution angle is 0 degree, in a luminous intensity distribution curve of the light sources 7.

Furthermore, the light-distribution control element 6 is rod-shaped according to the embodiment. Thus, the surface light source apparatus 200 can include the light-distribution control elements 6 less in number than the light sources 7 arranged in a row. The number of the light-distribution control elements 6 is, for example, one according to the embodiment. As such, when the light-distribution control element 6 is rod-shaped, it is possible to reduce the number of the light-distribution control elements 6 for use in the surface light source apparatus 200. Since fixing one of the light-distribution control elements 6 for the light sources 7 arranged in a row will suffice in the mounting process, the fixing operations including a bonding process are facilitated.

Furthermore, the rod-shaped light-distribution control element 6 can be manufactured by extrusion. In a method of manufacturing the light-distribution control element 6 by extrusion, the length of the light-distribution control element 6 can be changed freely. For example, even when the liquid crystal displays 100 differ in size, the light-distribution control elements 6 with only the length changed can be manufactured using the same die and mounted onto the surface light source apparatus 200. Furthermore, even when the number of the light sources 7 to be installed increases or decreases, it is unnecessary to change the die for the light-distribution control elements 6 for the same reasons. Thus, the number of the light sources 7 to be installed in the surface light source apparatus 200 can be easily changed according to change in specification of the luminance. As a result, the surface light source apparatus 200 can obtain the optimal specification on the number and disposition of the light sources 7. As described above, the light-distribution control element 6 has greater versatility in change in the specification of the surface light source apparatus 200.

The light-distribution control element 6 has a function of changing the distribution of the light emitted from the light sources 7. The "distribution" means the distribution of the luminous intensity of light emitted from a light source into a space. In other words, the "distribution" means spatial distribution of the light emitted from the light source. Furthermore, the "luminous intensity" indicates the intensity of light emitted from a luminous element, and is obtained by dividing the pencils of light passing through a minute solid angle in a direction by the minute solid angle. In other words, the luminous intensity is a physical quantity indicating at which intensity of light a light source emits light. With such a structure, the light-distribution control element 6 converges or diverges the light emitted from the light sources 7 on the y-z plane.

Diffuser

As illustrated in FIG. 1, the diffuser 4 is disposed to cover the opening part 53. The diffuser 4 is disposed on the light emitting surface of the surface light source apparatus 200. In other words, the diffuser 4 is disposed on the +z-axis side with respect to the reflector 5. The diffuser 4 is, for example, thin plate-shaped. Alternatively, the diffuser 4 is, for example, sheet-shaped. Alternatively, the diffuser 4 may have a structure including a transparent substrate and a diffuser film formed on the transparent substrate.

The diffuser 4 diffuses the transmitted light. The "diffuses" means spreading out of light. In other words, the "diffuses" means scattering of light. In the following, for example, the expression "the light rays reach the diffuser 4" is used. As described above, the diffuser 4 is disposed on the opening part 53 of the reflector 5. Thus, the expression "the light rays reach the diffuser 4" can be replaced with the expression "the light rays reach the opening part 53". Furthermore, the opening part 53 or the diffuser 4 functions as the light emitting surface of the surface light source apparatus 200. Thus, the expression "the light rays reach the diffuser 4" can be replaced with the expression "the light rays reach the light emitting surface of the surface light source apparatus 200".

Reflector

Figure 3:
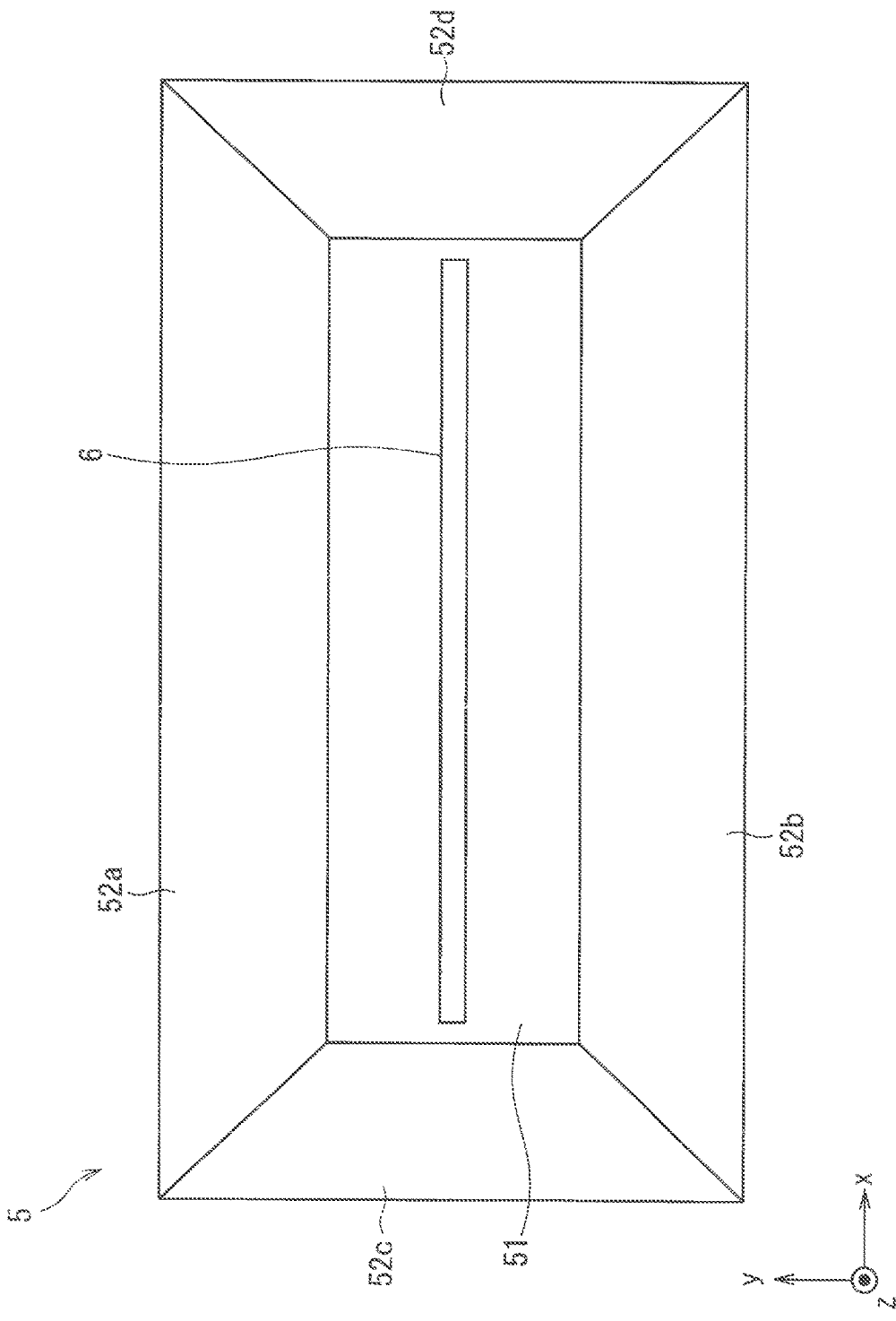
FIG. 3 is a plan view of a reflector included in the surface light source apparatus according to the embodiment.

As illustrated in FIG. 1, the surface light source apparatus 200 includes the reflector 5. The reflector 5 has a container shape capable of accommodating the light sources 7 and the light-distribution control element 6. FIG. 3 is a plan view of the surface light source apparatus 200. In FIG. 3, illustration of the diffuser 4 is omitted. The reflector 5 has a bottom surface 51 and four side surfaces 52 (52a, 52b, 52c, 52d) as illustrated in FIGS. 1 and 3. In other words, the reflector 5 has five surfaces. In a plane of the bottom surface 51, the light sources 7 and the light-distribution control element 6 both held by the holding substrate 8 are disposed. Furthermore, the side surfaces 52 surround the outer circumference of the opening part 53 facing the bottom surface 51. The side surfaces 52 connect the outer circumference of the bottom surface 51 to the outer circumference of the diffuser 4 according to the embodiment. The bottom surface 51 is a rectangle smaller than that of the diffuser 4. The bottom surface 51 is disposed parallel to the diffuser 4, that is, parallel to the light emitting surface of the surface light source apparatus 200. In other words, the four side surfaces 52 are inclined from the outer circumference of the bottom surface 51 to the outer circumference of the diffuser 4.

The shape of the reflector 5 will be described using x-y-z coordinate axes. Out of the four side surfaces 52, the two side surfaces 52a and 52b connected to respective sides of the bottom surface 51 that are parallel to the x-axis direction are inclined to increase the space between them in the +z-axis direction. In other words, the side surface 52a in the +y-axis direction is inclined anti-clockwise with respect to the y-z plane when viewed from the −x-axis direction, from the portion connected to the bottom surface 51 as a center. Furthermore, the side surface 52b in the −y-axis direction is inclined clockwise with respect to the y-z plane when viewed from the −x-axis direction, from the portion connected to the bottom surface 51 placed as a center. Furthermore, out of the four side surfaces 52, the two side surfaces 52c and 52d connected to respective sides of the bottom surface 51 parallel to the y-axis direction are inclined to increase the space between them in the +z-axis direction. In other words, the side surface 52c in the −x-axis direction is inclined anti-clockwise with respect to the z-x plane when viewed in the −y-axis direction, from the portion connected to the bottom surface 51 placed as a center. Furthermore, the side surface 52d in the +x-axis direction is inclined clockwise with respect to the z-x plane when viewed in the −y-axis direction, from the portion connected to the bottom surface 51 placed as a center. In the +z-axis direction facing the bottom surface 51 of the reflector 5, the opening part 53 is formed. The reflector 5 and the diffuser 4 form a hollow container.

As illustrated in FIGS. 1 and 2, the reflector 5 has the reflecting surface 54 inside. In other words, the inner portion of the reflector 5 is made of a reflective material. The reflector 5 is, for example, a light reflection sheet that is a sheet-shaped part. The reflecting surface 54 of the reflector 5 may be, for example, a diffusely reflecting surface. The reflector 5 is, for example, a light reflection sheet made of a resin such as polyethylene terephthalate as a base material, or a light reflection sheet obtained by evaporating a metal onto a surface of a substrate.

Light Rays Passing Through Light-Distribution Control Element

Figure 4:
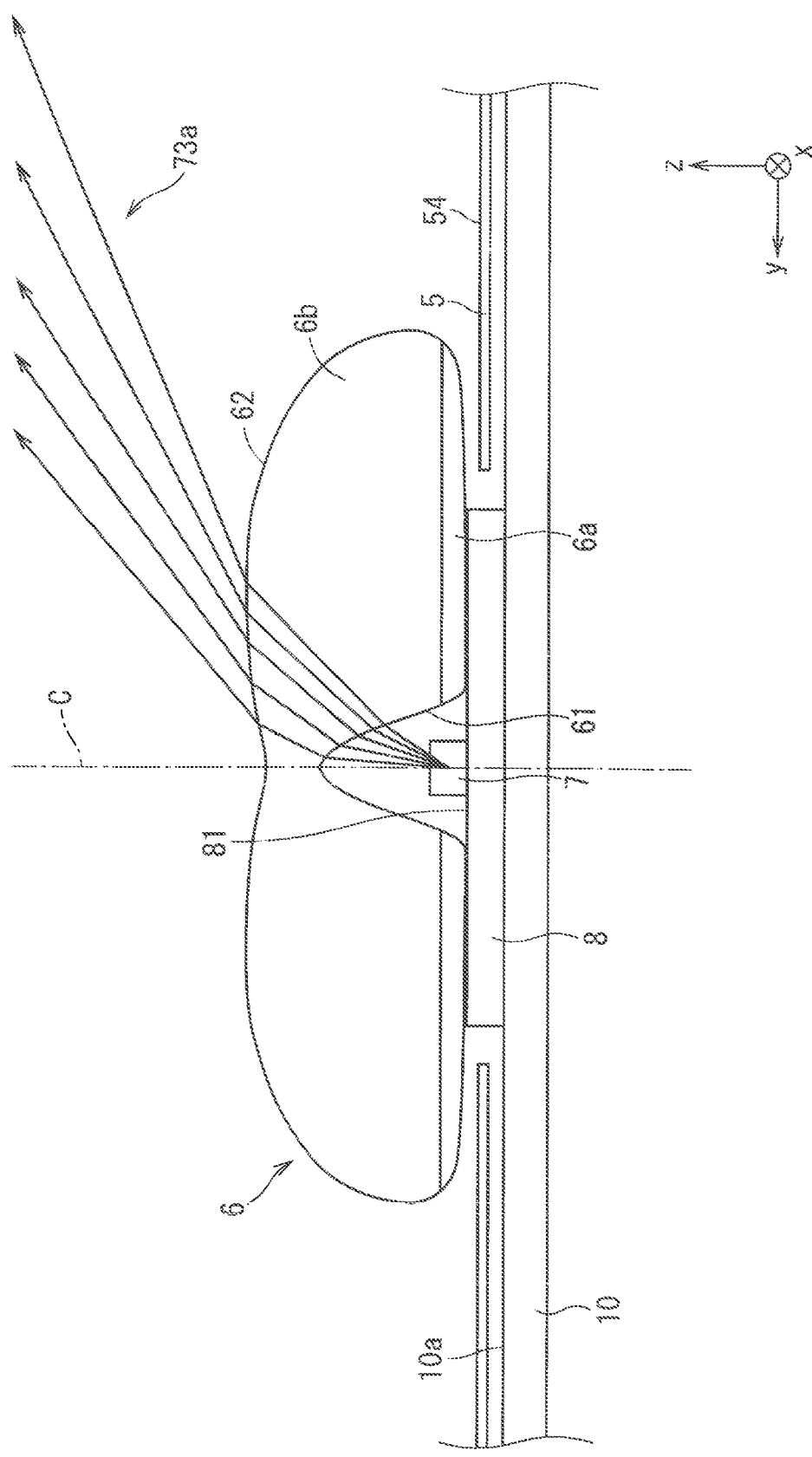
FIGS. 4 to 7 illustrate light rays emitted from the light source of the surface at source apparatus according to the embodiment.
Figure 5:
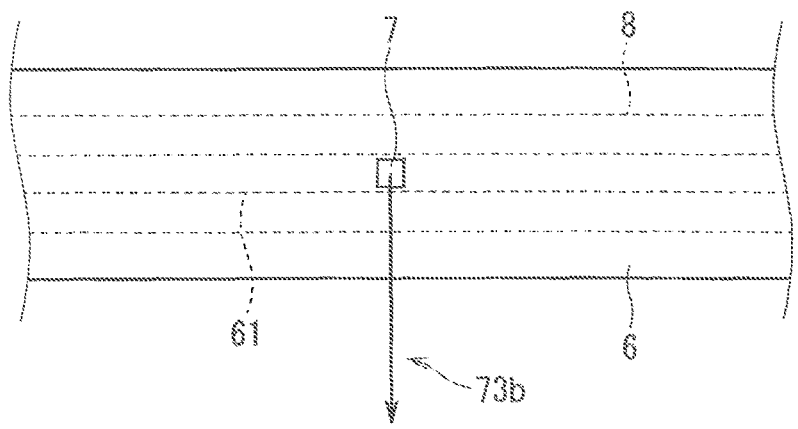

FIG. 4 illustrates light rays emitted from the light source 7 of the surface light source apparatus 200. Light rays 73a are emitted from the light source 7 in the +z-axis direction, and are a part of the light rays spreading out only toward the y-z plane. The light rays 73a are light rays emitted from the light source 7 at a narrow angle with respect to the optical axis C. The light rays 73a are refracted at the light incident surface 61, and enter the light-distribution control element 6. According to Snell's law, when light rays enter a medium with a higher refractive index from a medium with a lower refractive index, the angle of refraction of the light rays is smaller than the angle of incidence. Conversely, when light rays enter a medium with a lower refractive index from a medium with a higher refractive index, the angle of refraction of the light rays is larger than the angle of incidence. When the light-distribution control element 6 is made of an acrylic resin, the light rays 73a are refracted at the light incident surface 61 in the −y-axis direction as illustrated in FIG. 4. The light rays 73a travel through the light-distribution control element 6, and reach the light emitting surface 62. The light rays 73a are refracted at the protruding light emitting surface 62 in a direction of increasing the angle with respect to the optical axis C, that is, in the −y-axis direction. FIG. 5 is a plan view of the light-distribution control element 6 when the x-y plane is observed from the +z-axis direction. FIG. 5 includes the illustration of partial light rays 73b emitted from the light source 7. The light rays 73b are light rays emitted from the light source 7 and having an angle wider than that of the light rays 73a with respect to the optical axis C in the light rays spreading only on the y-z plane. The light rays spreading only on the y-z plane means light rays spreading only in the vertical direction of FIG. 5. As illustrated in FIGS. 4 and 5, the light-distribution control element 6 diverges the light emitted from the light source 7. The light rays 73a or 73b emitted from the light source 7 reach the diffuser 4. Although the illustration of the respective light rays is omitted in the following description, a part of the light rays that have reached the diffuser 4 illustrated in FIG. 1 are reflected off, and travel through the container-shaped space in the reflector 5. The light rays are reflected by the bottom surface 51 or the side surfaces 52 of the reflector 5, and reach the diffuser 4 again. The light is diffused while passing through the diffuser 4. Then, the light passing through the diffuser 4 is output as the homogeneous surface illumination light. This illumination light illuminates the rear surface 1b of the liquid crystal panel 1 through the optical sheets 3 and 2.

The light emitted from the light sources 7 includes not only the light passing through the light emitting surface 62 as the light rays 73a in FIG. 4 but also the light reflected by the light emitting surface 62. Particularly, when light rays enter a medium with a lower refractive index from a medium with a higher refractive index, total internal reflection may occur at a boundary between the two media. For example, when the light-distribution control element 6 is made of an acrylic resin (PMMA) having a refractive index of 1.49 and a medium at a light emitting side, that is, the container-shaped space in the reflector 5 is filled with the air, light rays whose angle of incidence to the light emitting surface 62 is larger than 42.1° satisfy the total internal reflection conditions. Consequently, the light rays are reflected by the light emitting surface 62 toward the holding substrate 8 or the reflector 5. In other words, the light rays are reflected in the −z-axis direction. The total internal reflection conditions can be avoided by designing respective shapes of the light incident surface 61 and the light emitting surface 62 in such a manner that an angle of incidence of the light propagating only the y-z plane is smaller than or equal to 42.1°. Accordingly, the light rays can be spread from the light emitting surface 62 toward the diffuser 4.

Figure 6:
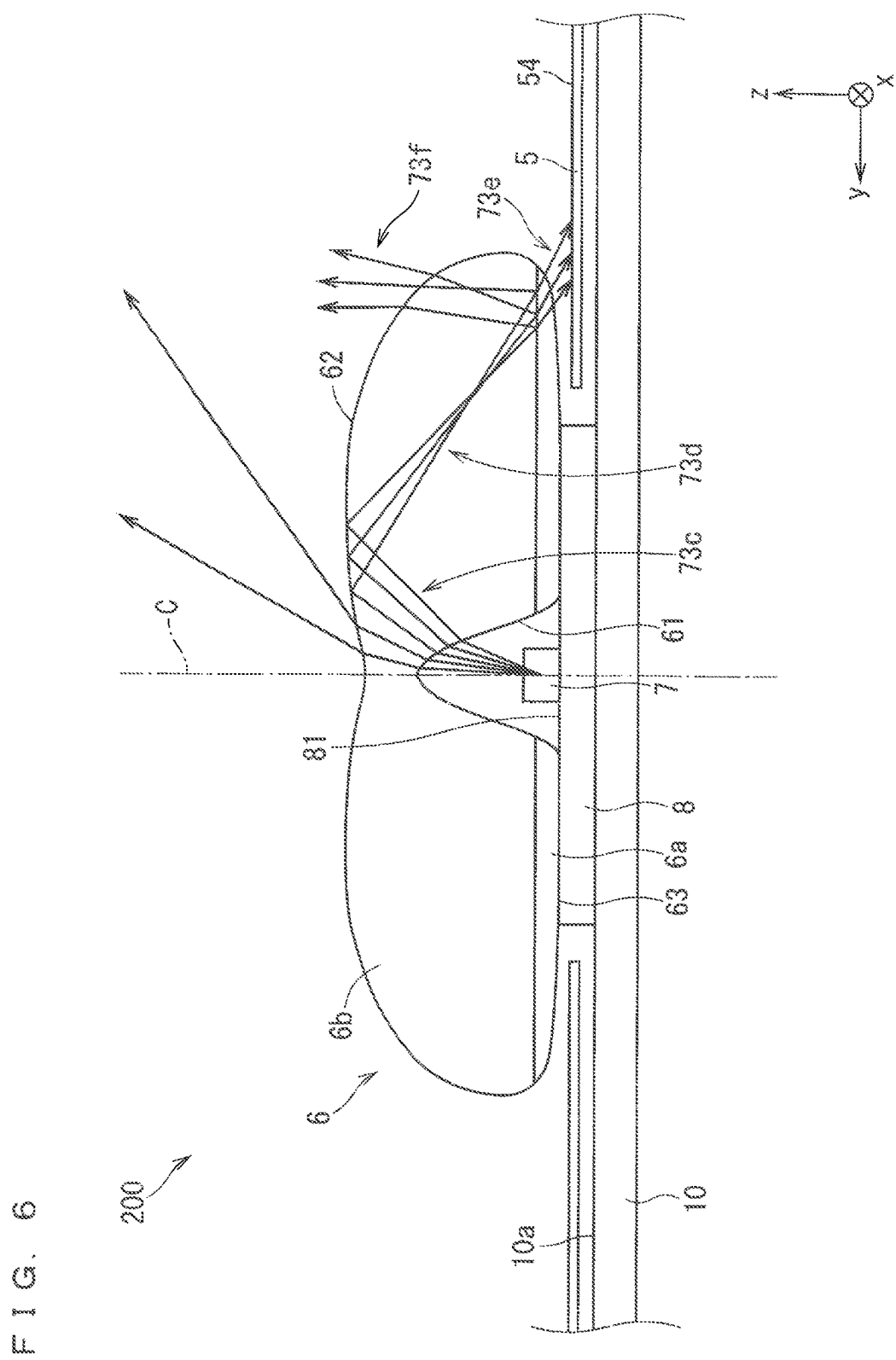
Figure 7:
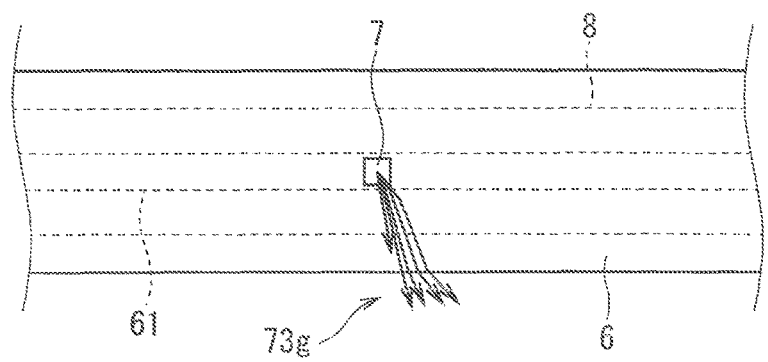

FIG. 6 illustrates light rays emitted from the light source 7 of the surface light source apparatus 200. In contrast to the light rays 73a in FIG. 4, light rays 73c have an angle component spreading in the x-axis direction, that is, a vector component in the x-axis direction. Furthermore, FIG. 7 is a plan view of the light-distribution control element 6 when the x-y plane is observed from the +z-axis direction. FIG. 7 includes the illustration of partial light rays 73g emitted from the light source 7. The light rays 73g have a vector component in the x-axis direction. The light rays having an angle component in the x-axis direction means light rays spreading diagonally or parallel to the x axis in FIG. 7. The light rays 73c in FIG. 6 and the light rays 73g in FIG. 7 have an angle of incidence larger than that of the light rays 73a propagating only the y-z plane in FIG. 4, with respect to the light emitting surface 62. This is because the vector component in the x-axis direction is combined with the angle of incidence with respect to the light emitting surface 62. Thus, light rays having a larger vector component in the x-axis direction tend to satisfy the total internal reflection conditions.

A trajectory of the light rays 73d reflected by the light emitting surface 62 in the light rays 73c in FIG. 6 will be hereinafter described. The light rays 73d travel in the −z-axis direction. When the light-distribution control element 6 does not include the diffusion part 6a, the light rays 73d are reflected by the bottom surface or a part of the side surfaces of the light-distribution control element 6, and reach the reflector 5. Light rays 73e that have reached the reflector 5 are diffusely reflected. Although the illustration is omitted, a part of the light rays that have been diffusely reflected enter the light-distribution control element 6 again, and the rest of the light rays reach the diffuser 4. The light rays incident on the light-distribution control element 6 are refracted at the light emitting surface 62, and emitted. The light rays emitted from the light emitting surface 62 reach the diffuser 4. Furthermore, a part of the light rays 73d reflected by the light emitting surface 62 reach the main surface 81 of the holding substrate 8 (not illustrated). The light rays are reflected off the main surface 81, and enter the light-distribution control element 6 again. Then, the light rays are refracted at the light emitting surface 62 of the light-distribution control element 6, and reach the diffuser 4.

As described above, the light rays emitted from the light source 7 and reaching the diffuser 4 can be divided into two components, that is, a direct light component and a reflected light component. In the light rays emitted from the light source 7, the light rays that are reflected at the light-distribution control element 6 and then directly reach the diffuser 4 are made of the direct light component. The light rays that are reflected inside the light-distribution control element 6, are then diffusely reflected at the reflector 5, and reach the diffuser 4 are made of the reflected light component. Since the reflected light component is subject to the influence of the diffuse reflection of the reflector 5, it is difficult to control the spatial luminance distribution using the light-distribution control element 6. The surface light source apparatus 200 needs to control the distribution of light including the reflected light component to efficiently use the light emitted from the light sources 7. Furthermore, the surface light source apparatus 200 preferably controls the balance between the direct light component and the reflected light component using the light-distribution control element 6 to obtain the illumination light having a homogenous luminance distribution on the light emitting surface. Examples of the required control include deliberately making the distribution of the direct light component uneven according to the distribution of the reflected light component, using the light-distribution control element 6.

Effect of Diffusion Part of Light-Distribution Control Element

As illustrated in FIGS. 2 and 6, the surface light source apparatus 200 according to the embodiment includes the diffusion part 6a at the installation surface 63 of the light-distribution control element 6. The light rays 73d reflected by the light emitting surface 62 travel in the −z-axis direction, and reach the diffusion part 6a provided at the installation surface 63 of the light-distribution control element 6. Light rays 73f diffusely reflected by the diffusion part 6a enter the light emitting surface 62 again. The light rays 73f are emitted with refraction, and reach the diffuser 4. In other words, the light rays 73f consist of the direct light component. Furthermore, the light rays 73e passing through the diffusion part 6a without being refracted reach the reflector 5 as described above. The light rays 73e are diffusely reflected, and then reach the diffuser 4. The light rays 73e consist of the reflected light component.

Advantages

In contrast to the surface light source apparatus excluding the diffusion part 6a, the surface light source apparatus 200 including the diffusion part 6a according to the embodiment can increase the direct light component superior in controllability more than the reflected light component. The surface light source apparatus 200 can improve the homogeneity of surface light by changing the balance between the direct light component and the reflected light component. Furthermore, with enabling of changing the balance between the direct light component and the reflected light component, even a surface light source apparatus including a fewer number of the light sources 7 disposed in a part of the area than the conventional ones can control the light distribution in which homogenous surface light can be provided.

The surface light source apparatus 200 according to the embodiment includes: the light source 7; the holding substrate 8 having the main surface 81 on which the light source 7 is held; the light-distribution control element 6 disposed on the main surface 81 of the holding substrate 8 to cover the light source 7, the light-distribution control element 6 changing distribution of light emitted from the light source 7; and the diffuser 4 that diffuses light emitted from the light-distribution control element 6. Then, the light-distribution control element 6 includes the diffusion part 6a disposed at the installation surface 63 that can abut the main surface 81 of the holding substrate 8. With such a structure, the surface light source apparatus 200 can improve the homogeneity of surface light using both the light rays passing through the light emitting surface 62 of the light-distribution control element 6 and the light rays reflected by the light emitting surface 62. Furthermore, the surface light source apparatus 200 even with a structure including a fewer number of the light sources 7 disposed in a part of the area than the conventional ones can change the distribution of the light emitted from the light-distribution control element 6 into a direction of the light emitting surface (the diffuser 4) of the surface light source apparatus 200. As a result, the surface light source apparatus 200 can obtain the illumination light having the luminance distribution with higher homogeneity than the conventional ones. Furthermore, the surface light source apparatus 200 can improve the homogeneity of surface light while including the light-distribution control element 6 that is simple and has greater versatility. The surface light source apparatus 200 can be used as, for example, a luminaire for lighting a room, besides a backlight of the liquid crystal display 100. Furthermore, the surface light source apparatus 200 can be used as, for example, an advertisement display illuminating photos from the rear surface side thereof.

Furthermore, the light-distribution control element 6 of the surface light source apparatus 200 according to the embodiment further includes the light-distribution control element body 6b formed as a single part with the diffusion part 6a. Then, the diffusion part 6a contains a diffusing material higher in concentration than a diffusing material contained in the light-distribution control element body 6b. With such a structure, the surface light source apparatus 200 can obtain the illumination light having the luminance distribution with higher homogeneity than the conventional ones while including the light-distribution control element 6 that is simple and has greater versatility.

Furthermore, the surface light source apparatus 200 according to the embodiment further includes a plurality of the light sources 7 arranged in a row on the main surface 81 of the holding substrate 8. The light-distribution control element 6 has a rod shape along a direction in which the plurality of the light sources 7 are arranged. The light-distribution control element 6 has (i) the light emitting surface 62 including a protruding cylindrical surface having a curvature in a short-side direction of the rod shape, and (ii) the light incident surface 61 extending in a long-side direction of the rod shape and including a depressed curved surface or a flat surface to cover the plurality of the light sources 7. With such a structure, the surface light source apparatus 200 even with a structure including a fewer number of the light sources 7 disposed in a part of the area than the conventional ones can change the distribution of the light emitted from the light-distribution control element 6 into a direction of the light emitting surface (the diffuser 4) of the surface light source apparatus 200. Since fixing the light-distribution control elements 6 that are less in number than the light sources 7 arranged in a row will suffice in the mounting process thereof, the mounting operations are facilitated. Furthermore, the rod-shaped light-distribution control elements 6 can be manufactured by extrusion, which can reduce the manufacturing cost of the surface light source apparatus 200.

Furthermore, the surface light source apparatus 200 according to the embodiment further includes the reflector 5. The reflector 5 includes the reflecting surface 54, and the opening part 53 on which the diffuser 4 is disposed. Furthermore, the reflector 5 has a container shape capable of accommodating the light source 7 and the light-distribution control element 6. The reflecting surface 54 is disposed along an inner surface of the container shape, and reflects the light emitted from the light-distribution control element 6. The opening part 53 emits, through the diffuser 4, the light emitted from the light-distribution control element 6 and the light reflected by the reflecting surface 54. With such a structure, the surface light source apparatus 200 even with a structure including a fewer number of the light sources 7 disposed in a part of the area than the conventional ones can change the distribution of the light emitted from the light-distribution control element 6 into a direction of the light emitting surface (the diffuser 4) of the surface light source apparatus 200. Consequently, the surface light source apparatus 200 can obtain the illumination light having the luminance distribution with higher homogeneity than the conventional ones.

Furthermore, the liquid crystal display 100 according to the embodiment includes the surface light source apparatus 200 and the liquid crystal panel 1. The liquid crystal panel 1 receives surface light emitted from the diffuser 4 of the surface light source apparatus 200, converts the surface light into image light, and emits the image light. With such a structure of the liquid crystal display 100, the surface light source apparatus 200 whose light homogeneity has been improved more than the conventional ones can illuminate the liquid crystal panel 1. Consequently, the liquid crystal display 100 can achieve the higher image quality than the conventional ones.

Modification 1 of Embodiment

Figure 8:
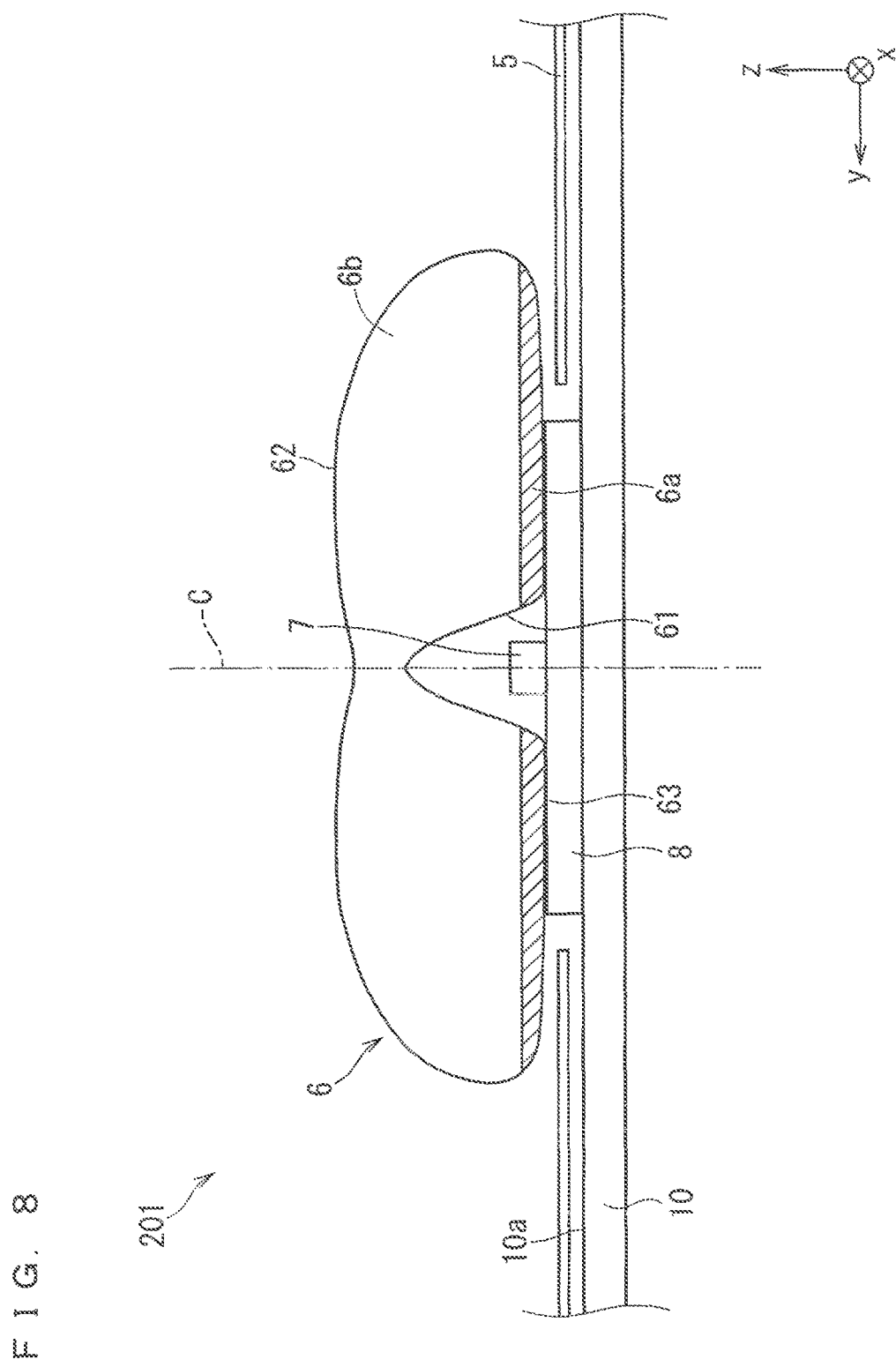
FIG. 8 illustrates a cross section of a structure of the vicinity of the light source included in a surface light source apparatus according to Modification 1.

FIG. 8 illustrates a cross section of the vicinity of the light source 7 of a surface light source apparatus 201 according to Modification 1 of the embodiment. The diffusion part 6a of the light-distribution control element 6 according to Modification 1 is a thin film. The thin film is made of a high reflective material. Furthermore, the thin film is formed by printing. The light-distribution control element 6 included in the surface light source apparatus 200 according to the embodiment is formed by integrating the diffusion part 6a and the light-distribution control element body 6b as a single part through two-color molding. The diffusion part 6a in the light-distribution control element 6 included in the surface light source apparatus 201 according to Modification 1 can be formed by printing, which facilitates the production more than by the two-color molding.

The surface light source apparatus 201 according to Modification 1 produces the same advantages as those of the surface light source apparatus 200 according to the embodiment. In other words, the surface light source apparatus 201 even with a structure including a fewer number of the light sources 7 disposed in a part of the area than the conventional ones can change the distribution of the light emitted from the light-distribution control element 6 into a direction of the light emitting surface (the diffuser 4) of the surface light source apparatus 201. Consequently, the surface light source apparatus 201 can obtain the illumination light having the luminance distribution with higher homogeneity than the conventional ones. Furthermore, the surface light source apparatus 201 can reduce the manufacturing cost of the light-distribution control element 6.

The surface light source apparatus 201 may have a structure in which the thin film is formed on the installation surface 63 of the light-distribution control element 6 that is formed as a single part according to the embodiment. The surface light source apparatus 201 with such a structure can further increase the direct light component.

Modification 2 of Embodiment

Figure 9:
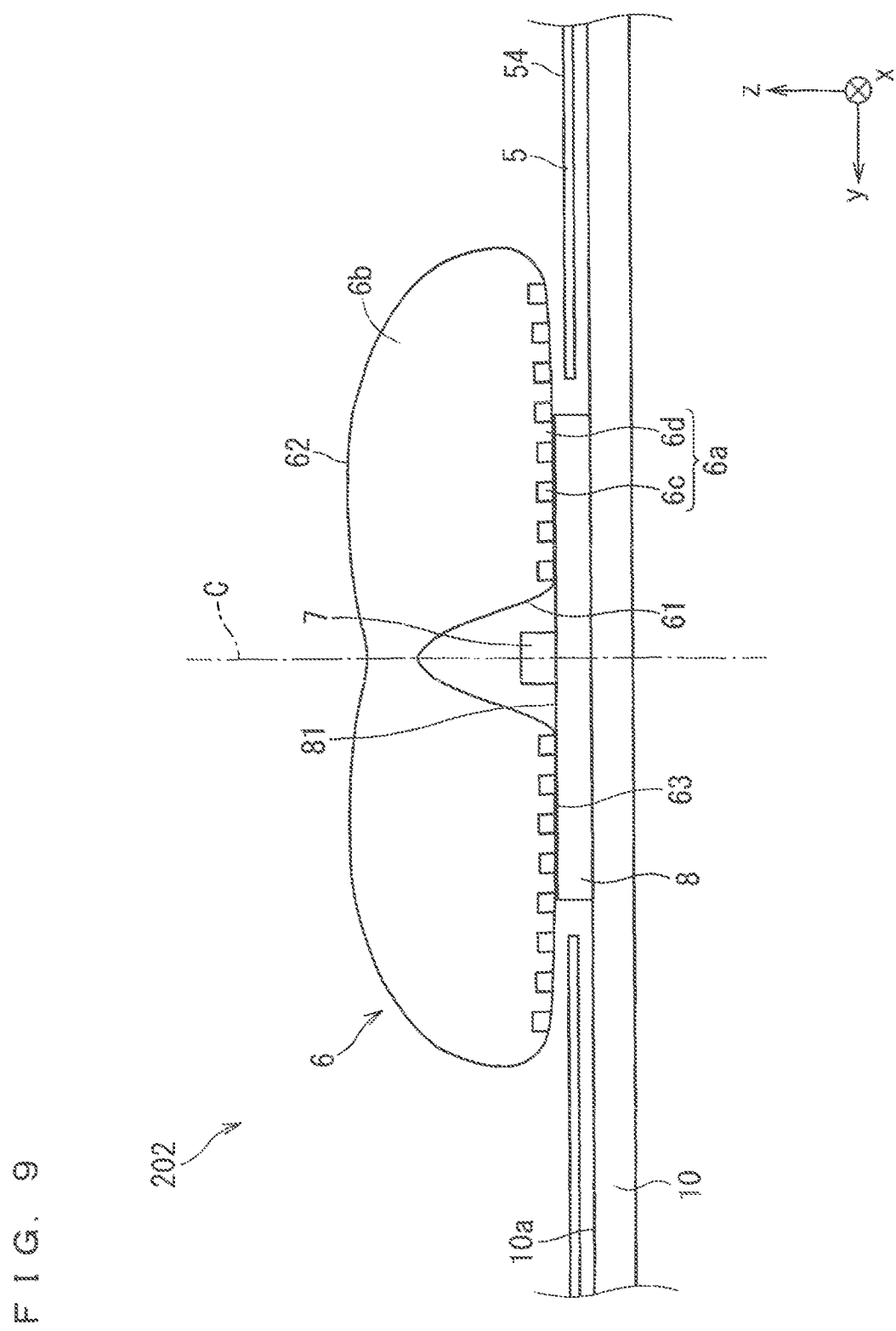
FIG. 9 illustrates a cross section of a structure of the vicinity of the light source included in a surface light source apparatus according to Modification 2.

FIG. 9 illustrates a cross section of the vicinity of the light source 7 of a surface light source apparatus 202 according to Modification 2 of the embodiment. The diffusion part 6a of the light-distribution control element 6 according to Modification 2 has a concavo-convex surface including depressed parts 6c and protruding parts 6d. The concavo-convex surface is formed by, for example, sand blasting. The light-distribution control element 6 according to Modification 2 can be formed by mechanical or chemical processes, which facilitates the production more than by the two-color molding. Furthermore, the surface light source apparatus 202 according to Modification 2 produces the same advantages as those of the embodiment. In other words, the surface light source apparatus 202 even with a structure including a fewer number of the light sources 7 disposed in a part of the area than the conventional ones can change the distribution of the light emitted from the light-distribution control element 6 into a direction of the light emitting surface (the diffuser 4) of the surface light source apparatus 202. Consequently, the surface light source apparatus 202 can obtain the illumination light having the luminance distribution with higher homogeneity than the conventional ones. Furthermore, the surface light source apparatus 202 can reduce the manufacturing cost of the light-distribution control element 6.

The surface light source apparatus 202 may have a stricture in which the concavo-convex surface is formed on the installation surface 63 of the light-distribution control element 6 formed as a single part according to the embodiment. The surface light source apparatus 202 with such a structure can further increase the direct light component.

Modification and Advantages of Light-Distribution Control Element

The light-distribution control element 6 is a rod-shaped optical element disposed to cover the plurality of light sources 7 according to the embodiment. However, the light-distribution control element 6 is not limited to such a rod-shaped optical element. The surface light source apparatus produces the same advantages as those of the embodiment, even with one light source equipped with one light-distribution control element. However, a surface light source apparatus including a light-distribution control element separately for each light source has increased number of the light-distribution control elements for use. Furthermore, the manufacturing processes require fixing the light-distribution control elements (lenses) to the respective light sources, which increase the number of processes. In contrast, the surface light source apparatus 200 can include the light-distribution control elements 6 less in number than the light sources 7 arranged in a row. For example, the number of the rod-shaped light-distribution control elements 6 may be one. As such, it is possible to reduce the number of the light-distribution control elements 6 for use in the surface light source apparatus 200. Since fixing one of the light-distribution control elements 6 to the light sources 7 arranged in a row will suffice in the mounting process thereof, the fixing operations including a bonding process are facilitated.

Furthermore, an optical element requiring its positioning in the x or y direction with respect to a light source will be used as a light-distribution control element, such as a lens array in which a plurality of lenses are arranged on an x-y plane. However, the size of an optical element covering light sources needs to be changed, according to increase or decrease in the number of the light sources. In other words, it is necessary to change a die for manufacturing the optical element, according to increase or decrease in the number of the light sources. Such an optical element has less versatility on change in the specification of a surface light source apparatus.

Since the light-distribution control element 6 included in the surface light source apparatus 200 is rod-shaped, it can be manufactured by extrusion. In a method of manufacturing the light-distribution control element 6 by extrusion, the length of the light-distribution control element 6 can be changed freely. For example, even when the liquid crystal displays 100 differ in size, the light-distribution control elements 6 with only the lengths changed can be manufactured using the same die and mounted onto the surface light source apparatus 200. Furthermore, even when the number of the light sources 7 to be installed increases or decreases, it is unnecessary to change the die for the light-distribution control elements 6 for the same reasons. Thus, the number of the light sources 7 to be installed in the surface light source apparatus 200 can be easily changed, according to change in specification of the luminance. As a result, the surface light source apparatus 200 can obtain the optimal specification on the number and disposition of the light sources 7. As described above, the light-distribution control element 6 has greater versatility in change in the specification of the surface light source apparatus 200.

The light-distribution control element 6 may be made of a material containing a diffusing material. The light rays incident on the light-distribution control element 6 are diffused b the diffusing material, and change their traveling directions. The light rays traveling inside the light-distribution control element 6 randomly change their traveling directions. The light rays whose directions have been changed reach the light emitting surface 62 of the light-distribution control element 6. The light rays emitted from the light emitting surface 62 of the light-distribution control element 6 can illuminate a wider range.

Furthermore, the light incident surface 61 or the light emitting surface 62 of the light-distribution control element 6 may have minute depressions and protrusions. The depressions and protrusions do not have to be formed entirely on the light incident surface 61 and the light emitting surface 62. The depressions and protrusions may be formed, for example, only on the light incident surface 61. Furthermore, the depressions and protrusions may be formed, for example, only on a partial area of the light emitting surface 62. In other words, the depressions and protrusions may be formed on a partial area of the light incident surface 61 or the light emitting surface 62. Furthermore, the depressions and protrusions do not have to have the same roughness in the entire area. For example, the depressions and protrusions of the light incident surface 61 may be smaller than those of the light emitting surface 62.

The light rays incident on the depressions and protrusions randomly change their traveling directions. Thus, the light-distribution control element 6 having the depressions and protrusions can reduce bright lines. The "bright lines" is an area linearly formed on a light emitting surface (the diffuser 4) of the surface light source apparatus 200 and having a higher luminance. Furthermore, the depressions and protrusions can reduce variations in luminance caused by the arrangement of the light sources 7, on a light emitting surface (the diffuser 4) of the surface light source apparatus 200. In other words, the depressions and protrusions can reduce a difference between a bright portion and a dark portion. Furthermore, the light-distribution control element 6 can distribute light over a wider area and illuminate the area.

The degree of diffusion of light by the diffusing material or the depressions and protrusions needs to be smaller than the degree of refraction of the light rays on the light incident surface 61 and the light emitting surface 62. This is because when scattering of light by the diffusing material or the depressions and protrusions is predominant, refraction and distribution of the light rays on the light incident surface 61 and the light emitting surface 62 of the light-distribution control element 6 as designed will be difficult. The distributed light is directed to a light emitting surface or the diffuser 4 of the surface light source apparatus 200 according to the refraction dependent on the shape of the light-distribution control element 6. Thus, it is probable that the luminance in the vicinity of the light sources 7 increases as the effect of diffusing light by the diffusing material or the depressions and protrusions increases and that the luminance decreases as the distance from the light sources is longer.

The terms, for example, "parallel" and "vertical" are used in the embodiment to describe a positional relationship between parts or the shape of a part. These terms cover a range that takes into account, for example, the manufacturing tolerances or variations in assembly. Thus, the description of a positional relationship between parts or the shape of a part in claims covers a range that takes into account, for example, the manufacturing tolerances or variations in assembly.

The embodiment of the present invention can be appropriately modified or omitted within the scope of the invention. Although the present invention is described in details, the description is in all aspects illustrative and does not limit the present invention. Therefore, numerous modifications that have yet been exemplified will be devised within the scope of the present technique.

While the invention has been shown and described in detail, the foregoing description is in all aspects illustrative and not restrictive. It is therefore understood that numerous modifications and variations can be devised without departing from the scope of the invention.

What is claimed is:

1. A surface light source apparatus, comprising:
   a light source;
   a holding substrate having a main surface on which said light source is held;
   a light-distribution control element disposed on said main surface of said holding substrate having a light incident surface that covers said light source and a light emitting surface from which light incident on the light incident surface is emitted outside of the light-distribution control element, the light emitting surface being positioned opposite to said light source with respect to the light incident surface; said light-distribution control element changing distribution of light emitted from said light source; and
   a diffuser that diffuses light emitted from said light-distribution control element, wherein
   said light-distribution control element includes a diffusion part disposed at an installation surface, separate from the light incident surface and the light emitting surface, of the light-distribution control element that can abut said main surface of said holding substrate,
   said light distribution control element is wider than said holding substrate, and
   said installation surface at which said diffusion part is disposed has a portion in contact with said main surface of said holding substrate and a portion extending from the portion in contact with said main surface to outside of said holding substrate and protruding outside of said main surface.

2. The surface light source apparatus according to claim 1, wherein
   said light-distribution control element further includes a light-distribution control element body formed as a single part with said diffusion part, and
   said diffusion part is more diffuse than the rest of the light-distribution control element body.

3. The surface light source apparatus according to claim 1, wherein said diffusion part includes a thin film.

4. The surface light source apparatus according to claim 1, wherein said diffusion part has depressions and protrusions.

5. The surface light source apparatus according to claim 1, further comprising
   a plurality of said light sources arranged in a row on said main surface of said holding substrate,
   wherein said light-distribution control element has a rod shape along a direction in which said plurality of said light sources are arranged, and (i) the light emitting surface includes a protruding cylindrical surface having a curvature in a short-side direction of said rod shape, and (ii) the light incident surface extends in a long-side direction of said rod shape and includes a depressed curved surface or a flat surface to cover said plurality of said light sources.

6. The surface light source apparatus according to claim 1, further comprising
   a reflector including a reflecting surface, and an opening part on which said diffuser is disposed; said reflector having a container shape capable of accommodating said light source and said light-distribution control element,
   wherein said reflecting surface is disposed along an inner surface of said container shape, and reflects said light emitted from said light-distribution control element, and
   said opening part emits, through said diffuser, said light emitted from said light-distribution control element and said light reflected by said reflecting surface.

7. A liquid crystal display, comprising:
   said surface light source apparatus according to claim 1; and
   a liquid crystal panel that receives surface light emitted from said diffuser of said surface light source apparatus, converts said surface light into image light, and emits said image light.

* * * * *